United States Patent [19]

Cotton et al.

[11] 3,771,146

[45] Nov. 6, 1973

[54] DATA PROCESSING SYSTEM INTERRUPT ARRANGEMENTS

[75] Inventors: John Michael Cotton, Bournemouth; James Jeffrey Llewelyn Williams, Marlow; David Cockburn Cosserat, London, all of England

[73] Assignee: Plessey Handel Und Investments A.G.,, Zug, Switzerland

[22] Filed: Jan. 22, 1973

[21] Appl. No.: 325,707

[30] Foreign Application Priority Data

Jan. 26, 1972 Great Britain .................... 3,601/72

[52] U.S. Cl. .......................................... 340/172.5
[51] Int. Cl. ...................... G06f 11/00, G08b 29/00
[58] Field of Search ................................ 340/172.5

[56] References Cited

UNITED STATES PATENTS

| | | | |
|---|---|---|---|
| 3,562,717 | 2/1971 | Harmon et al. | 340/172.5 |
| 3,573,736 | 4/1971 | Schlaeppi | 340/172.5 |
| 3,573,855 | 4/1971 | Cragon et al. | 340/172.5 |
| 3,609,697 | 9/1971 | Blevins et al. | 340/172.5 |
| 3,671,940 | 6/1972 | Kronies et al. | 340/172.5 |
| 3,706,077 | 12/1972 | Mori et al. | 340/172.5 |
| R27,230 | 11/1971 | Ulrich | 340/172.5 |
| R27,251 | 12/1971 | Amdahl et al. | 340/172.5 |

*Primary Examiner*—Paul J. Henon
*Assistant Examiner*—Jan E. Rhoads
*Attorney*—Alex Friedman et al.

[57] ABSTRACT

A data processing system includes a memory in which information is stored in segments and at least one processor unit arranged to co-operate with the memory and provided with at least one so-called capability register arranged to store a segment descriptor which includes information indicative of the base and limit addresses of a particular memory segment and is used in all memory access operations relevant to the particular memory segment and the processor unit includes a program interrupt arrangement having interrupt actuating means which when activated causes the processing of the current program to be suspended and the processing of an interrupt handling program to be commenced. The processor unit is provided with capability register restoration arrangements operative to load at least part of the capability register with a discrete characteristic code and discrete characteristic code detection means arranged to monitor the information content of each capability register as it is used and to activate the interrupt actuating means upon detection of the discrete characteristic code.

8 Claims, 13 Drawing Figures

DATA PROCESSING SYSTEM INTERRUPT ARRANGEMENTS

BACKGROUND OF THE INVENTION

The present invention relates to data processing systems and is more particularly concerned with program interrupt arrangements for use in real-time data processing systems employing memory protection techniques provided by so-called segment descriptors.

In such systems all the information in the system main memory is divided into blocks or so-called segments. Each segment is defined by a so-called "segment descriptor" consisting of base and limit addresses defining the bounds of the block. Each system program requiring access to a segment is provided with a so-called "capability" word for that segment consisting of the segment descriptor together with an "access type" code. When access to information in a segment is required by a processor module of the data processing system, a so-called "capability" register, which has previously been loaded with the capability (segment descriptor and access type code) word for that segment, is used (*a*) to obtain the absolute main memory address of the required information word and (*b*) to check the formed absolute address and memory access required against the segment bounds and the access type code of the pertinent capability word.

In multi-processor systems employing techniques of the above mentioned type the system memory comprises a main memory, which may be formed of a plurality of storage modules, and a backing store, typically a magnetic disc store. In the execution of any of the application programs by a processor module working information is extracted from or inserted into the main memory only. Consequently store access operations are all performed with the assumption that the segment descriptor in the capability register used for the memory access defines a segment in the main memory. Obviously arrangements must be provided for blocks or segments to be transferred between the main memory storage modules and the disc backing store automatically, without the processor module using these blocks being conscious that any such transfers are taking place. Accordingly when a processor module attempts to access an information block that block has to be automatically transferred into a main memory area if it is not already resident therein. Additionally it may be necessary, under memory module fault conditions for example, to relocate information segments in other memory modules before removing the faulty module from the system. It is necessary in such circumstances to ensure that other processor modules cannot gain access to a segment which is in the process of being relocated and it is a prime object of the present invention to provide a simple mechanism to detect an attempt to access a block which is in the course of being relocated. It is a further object of the invention to use the same mechanism to detect an access attempt to a block not currently in the main memory.

According to the invention there is provided a data processing system including a memory, in which information is stored in segments, and at least one processor unit arranged to co-operate with said memory and provided with at least one so-called capability register arranged to store a capability word which includes information indicative of the base and limit addresses of a particular memory segment and is used each time a memory access operation relevant to said particular memory segment is performed by said processor unit and said processor unit includes a program interrupt arrangement having interrupt actuating means which when activated causes the processing of the current program to be suspended and the processing of an interrupt handling program to be commenced, characterised in that said processor unit is provided with (*a*) capability register restoration arrangements operative to load at least part of said capability register with a discrete characteristic code and (*b*) discrete characteristic code detection means arranged (*i*) to monitor the information content of each capability register as it is used and (*ii*) to activate said interrupt actuating means upon detection of said discrete characteristic code.

By the provision of such an interrupt arrangement a processor module may be forced to enter the interrupt handler program each time any of its capability registers, having a discrete characteristic code in part thereof, is used. Consequently it now remains to provide a mechanism which causes the discrete characteristic code to be written into the relevant part of a particular capability register when required. Typically this is performed (*i*) when the segment to which the capability register relates is in the course of relocation within the system memory or (*ii*) when the segment to which the capability register to be loaded relates is currently located in the backing store. The first case is indicated by associating a predetermined indication when the relevant segment descriptor entry in a master segment descriptor table whereas the second case is indicated by a discrete indication associated with a pointer which is relevant to the master segment descriptor table entry.

In the preferred embodiment of the invention each processor module, of a multi-processor system, has no significant internal storage and has direct access to all the storage modules of the system memory. Each processor module is also typically of the type defined in our co-pending application Serial No. 146,334. In telecommunications system for example, provided with stored program control employing multi-processor systems of the above type, the control algorithm may typically be divided into a plurality of applications programs each dealing with a specific aspect of a telephone call set-up and switching-network administration procedures. At any one time more than one call may be at a similar stage of call set-up and consequently the same applications program may be in the course of execution by different processor modules concurrently. As a consequence it is necessary for the system control programs to be able to identify individually each "pass" of an applications program for scheduling purposes for example. Typically each pass of each applications program is considered as a "process" and from a scheduling point of view an active process equates to a task to be performed. Each process is allocated its own unique so-called "dump-stack" and "reserved capability pointer table" at its inception. Each dump-stack provides a storage segment into which working parameters are dumped each time the process is suspended before reaching completion. The reserved capability pointer table defines all the system facilities required for the execution of the process. The system facilities include all the storage segments both main memory segments and backing store segments and all the system resources such as computer peripheral equipment and the like necessary for the execution of the process. Each item in the reserved capability table defines a single system facility. The reserved capability pointer table items which relate to memory segments comprise a "pointer" field and an "access code" field. The pointer defines the first word of a three word entry in the master capability table defining the location of that segment in the memory whereas the access code defines the type of access (read only, read-write etc.) the process is to be permitted to that segment. The most significant two bits of the access code are used to define that the entry relates to a storage segment. The reserved capability pointer table items which relate to systems resources, such as a segment in backing store or the registers in computer pheripheral devices etc., are arranged so that the "access" code field defines the resource type whereas the pointer field relates to the entry defining the particular resource. Typically the two most significant bits of the "access code" define broadly the resource type.

According to a feature of the invention a processor module capability register is loaded in said part with all zeros when it is detected that the two most significant bits of the "access" code of the reserved capability table entry to be used to load the capability register define a resource rather than a memory segment.

According to a further feature of the invention a processor module capability register is loaded in said part with all zeros when the first word of the system capability table entry to be used to load the capability register contains all zeros.

By the provision of these two mechanisms the processor module may be "trapped" and diverted to perform an interrupt handling process under one of three mechanisms. These mechanisms are (*i*) zeros in the sumcheck word of the system capability table entry (*ii*) resource code in the "access" field and (*iii*) zero code in access field. The first mechanism allows a system control program to prevent access to a memory segment by all applications programs typically when that segment is being relocated within the main memory or up-dated. The second mechanism causes the processor to enter the interrupt handler program so that, for example, a system control input/output handler process can be performed in connection with the required system resource, whereas the third mechanism allows a system control program to prevent a single processor module from accessing a particular memory segment. This may occur when another applications process temporarily requires exclusive access to the memory segment.

The invention will be more readily understood from the following description of one embodiment which should be read in conjunction with the drawings accompanying the provisional specification.

BRIEF DESCRIPTION OF THE DRAWINGS

FIG. 10 shows a flow diagram, including only the significant parts of the operation performed in accordance with the preferred embodiment of the invention, of a "load capability register" instruction whereas.

GENERAL DESCRIPTION

Figure 1:
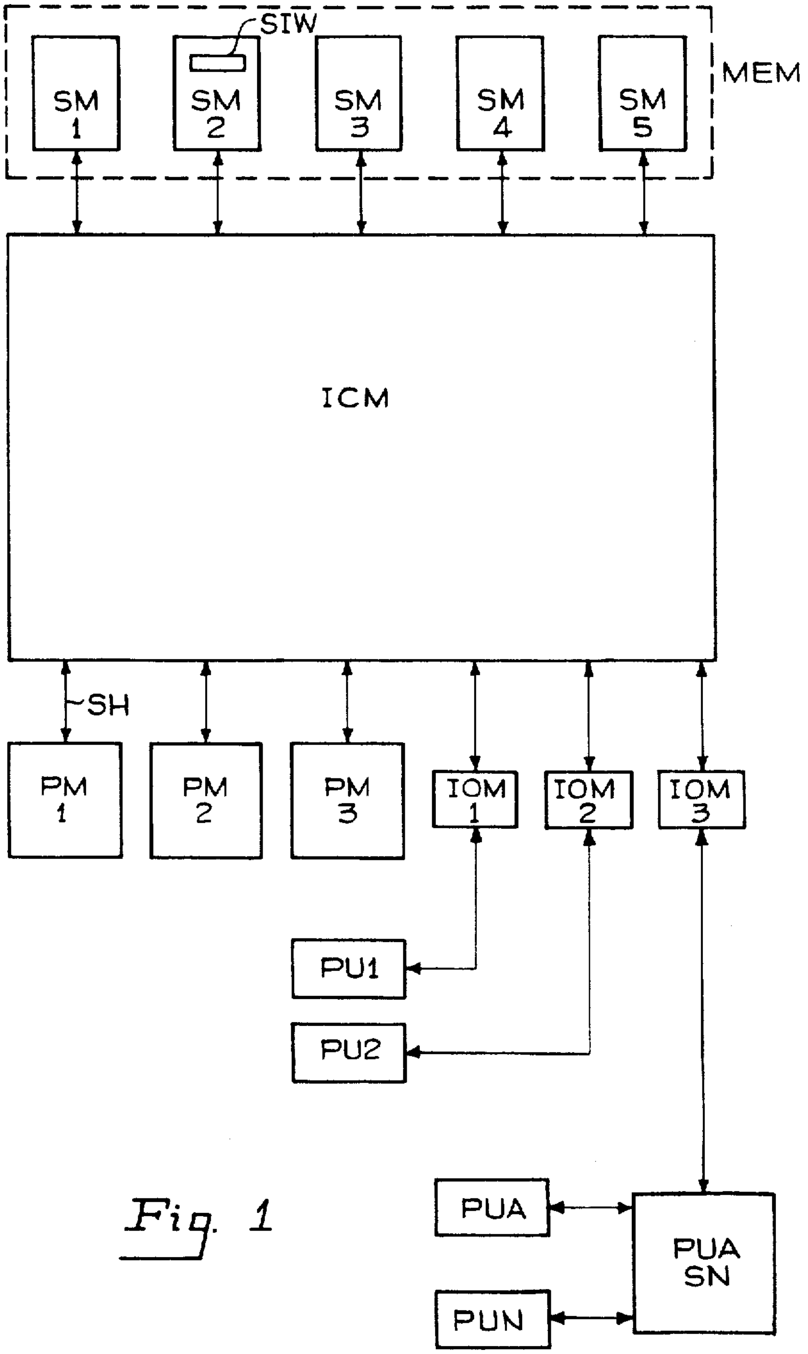
FIG. 1 shows a simple block diagram of a typical multi-processor system suitable for use with the embodiment of the invention.

Referring firstly to FIG. 1 brief consideration will be given to a typical multi-processor data processing system organised on a modular basis and suited to employing processor modules incorporating the preferred embodiment of the invention. The system consists typically of (*i*) a main memory MEM, including a number of storage modules SM1 to SM5, (*ii*) a number of processor modules PM1 to PM3, (*iii*) a number of input/output modules IOM1 to IOM3, which serve peripheral units PU1, PU2 and PUA to PUN, and (*iv*) an intercommunication medium ICM for memory to processor or input/output module communication. The actual quantities of the various modules shown in FIG. 1 are typical only and are not intended to be limiting to the present invention. The input/output modules IOM1 to IOM3 may be arranged to serve a single peripheral unit (such as PU1) or, by way of a peripheral unit access switching network PUASN a plurality of peripheral units (such as PUA to PUN) on a time-sharing basis.

Each processor module may be connected, by the intercommunication medium ICM, to any of the storage modules SM1-5 and the memory MEM provides storage for all the applications and supervisory(control) programs and working and permanent data for each process. While performing a process a processor module is arranged to extend a demand to the intercommunication medium indicative of the memory address required and the intercommunication medium timeshares the access demands to the various storage modules. The input/output modules IOM1 to IOM3 are also able to gain access to the memory for the interchange of information between particular memory areas and the peripheral unit.

Typically peripheral unit PU1 may be a disc store used as a backing store for the main memory MEM. In such circumstances it will be necessary from time to time to extract segments of information from the disc store and to insert them into defined areas of the memory MEM. Such an operation will be initiated by an input/output handler process which will inform the input/output module IOM1 of the memory areas involved and then leave that module IOM1 to asynchronously execute the required disc-to-main memory transfer. Upon completion of the transfer the input/output module sets its own interrupt bit in a system interrupt word SIW which is resident in the memory. At some subsequent time one of the processor modules will respond to the set system interrupt bit and subsequently any processes which were suspended awaiting the completion of the transfer are freed to continue. The operations of an interrupt system of the above type is disclosed and claimed in our co-pending application Serial No. 176,464.

In a modular data processing system to which the invention is particularly suited as has already been stated the memory is arranged on a segmented basis. All program data and process working and permanent data is distributed in segmented form amongst the various storage modules of the system memory. Each processor module is provided with a plurality of so-called capability registers each arranged to hold a capability word relating to a memory segment to which the processor requires access in the performance of the current process. Such an arrangement is disclosed in our co-pending application Serial No. 146,334.

Two of the capability registers in such a processor module are used to hole capability words relating to a so-called master (or system) capability table and a so-called reserved capability pointer table. The master capability table has one entry for each segment in the system memory and each entry includes information defining the base and limit addresses of the segment to which it relates. Thus the master capability table provides information on the location of the block in the memory for each information segment. Obviously some of the information segments will be common to a number of processes while others will be particular to a specific process. Each segment to which a process is required to have access is recorded in the process's reserved capability pointer table and each item thereof has two fields. The first field, the access code field, is used to define the type of access to the segment the process will be permitted, whereas the second field holds a pointer, relative to the base address of the master capability table, which defines the start of the entry of the segment descriptor for the particular segment.

The present invention makes use of both an entry in the master capability table and the access code in a reserved capability pointer table item to provide for the "trapping" of a process. Typically the master capability table entry will be marked when the memory segment to which it relates is being relocated whereas the access code of the relevant pointer item will be marked when access to the particular memory segment is to be barred to the particular process only. Additionally, as mentioned previously, resource capability pointers are also held in a process's reserved capability pointer table and the embodiment of the invention provides for the resetting of a capability register when any one of the above three conditions are detected.

Consideration will now be given, with reference to the accompanying drawings, to a processor module suitable to the incorporation of one embodiment of the invention.

PROCESSOR MODULE DESCRIPTION

Figure 2A:
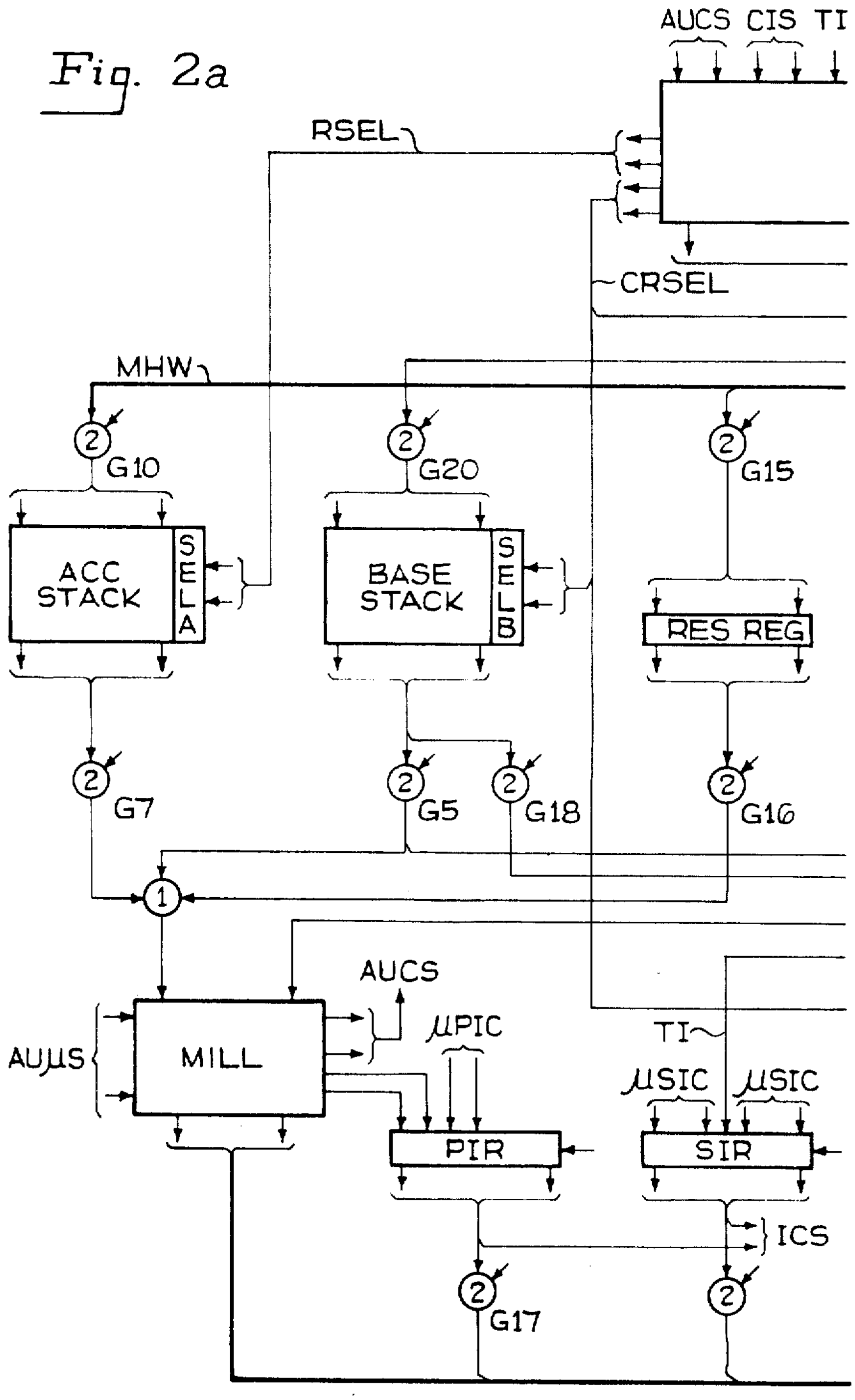
FIGS. 2*a* and 2*b* show, when placed side by side with FIG. 2*b* on the right, a block diagram of a processor module incorporating equipment in accordance with the specific embodiment of the invention to be described.
Figure 2B:
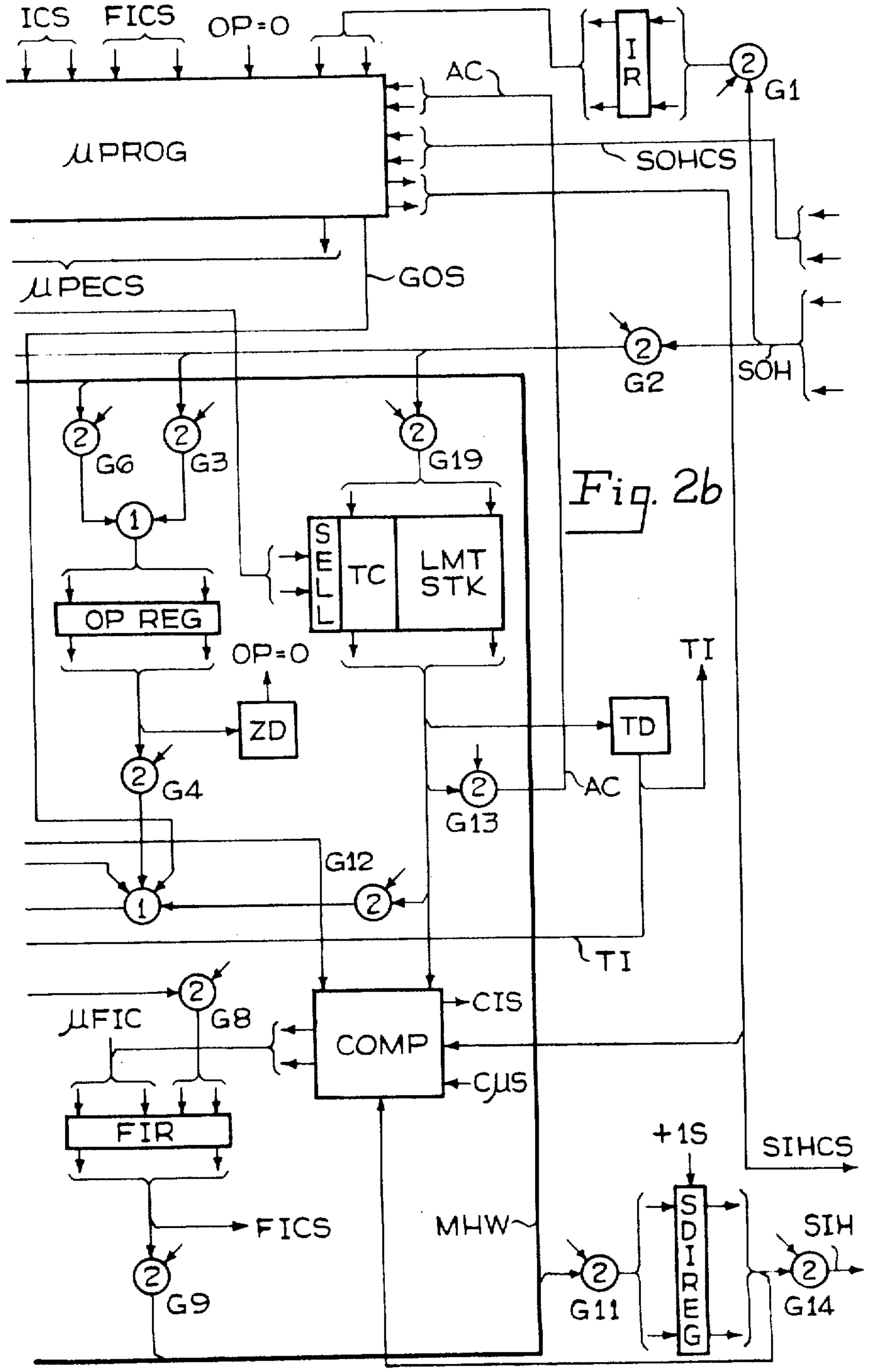

FIGS. 2*a* and 2*b* show the relevant details of a processor module incorporating one embodiment of the invention. The processor module includes an instruction register IR, a register stack of accumulator/working registers ACC STK, a result register RESREG, an operand register OPREG, a micro-program control unit $\mu$PROG, an arithmetic unit MILL, a comparator COMP, a memory data input register SDIREG a pair of memory protection (capability) register stacks BASE STK and TC/LMT STK, a set of machine indicator registers PIR (primary), SIR (secondary) and FIR (fault), a zero detection circuit ZD associated with the operand register and a "trap" condition detection circuit TD arranged to monitor the access code on leads AC. Typically the three register stacks (ACC STK, BASE STK and TC/LMT STK) may be constructed using so-called scratch-pad units and these units are provided with line selection circuits (SELA, SELB and SELL respectively) which control the connection of the required "register" of the stack to the input and output paths thereof.

The processor unit is organised for parallel processing although for ease of presentation the various data paths have been shown as a single lead in FIGS. 2*a* and 2*b*. The processor module is provided with a so-called main highway MHW, a store input highway SIH and a store output highway SOH. Each of these highways is typically of 24 bits corresponding to a memory word and the store highways SOH and SIH have associated therein control signal highways SOHCS and SIHCS. These control signal highways are used to carry control signals between the processor module and the memory and they include a so-called timing wire and for highway SIHCS store access (read, read-write etc.) control wires. Although the memory is not shown in FIGS. 2*a* and 2*b* it is to be assumed that highways SIH and SOH are connected to the system memory over the system intercommunication medium. Hence highways SIH and SOH, together with their associated control signal highways SIHCS and SOHCS, collectively equate to a path such as SH shown in FIG. 1.

Associated with the various highways are a number of micro-program signal controlled AND gates such as G2 (i.e. those gates which include a number 2 within them). It should be realised that each gate in practice will consist of a plurality such as twenty-four such gates one for each lead of the highway and these gates are activated, by a signal from the micro-program control unit $\mu$PROG on the unreferenced input lead thereto, to allow data on the various highways to be written into selected registers as required. AND gating, such as gate G4, is also provided at the output of the registers and register stacks allowing selective connection of the various machine registers to the arithmetic unit MILL or the machine highway MHW. Also shown in FIGS. 2*a* and 2*b* are a number of OR gates (i.e. those gates which include a number 1 within them) and these gates are provided for isolation purposes allowing two or more signal paths to be ORed into one input path.

Accumulator Stack (ACC STK)

Figure 3:
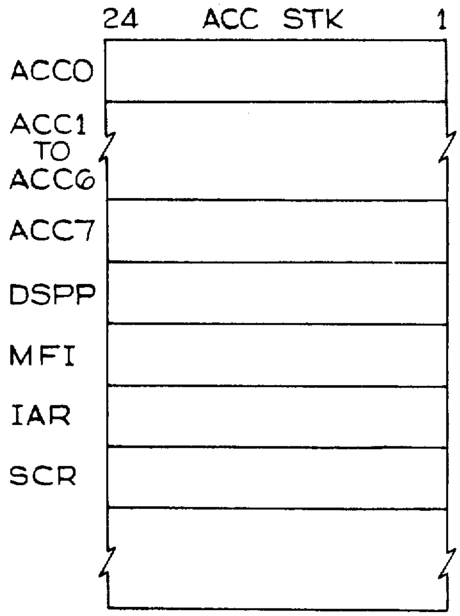
FIG. 3 shows the layout of the accumulator stack of the processor module of FIG. 2.

This scratch-pad unit is used to provide a number of accumulator registers, (ACCO-ACC7) which may also be used as mask registers or modifier registers, and the required one of the registers is selected by the code applied to leads RSEL either by micro-program control unit $\mu$PROG or by a register selection field or modifier select field in the instruction word in register IR. Also included in the accumulator stack ACC STK is a group of so-called hidden registers which include a sequence control register (SCR), an interrupt accept register (IAR), a machine fault indicator register (MFI) and a dump-stack-push-down-pointer register (DSPP) as shown in FIG. 3. The significance of these hidden registers will be seen later. The required register for any operation is selected by passing a selection code to the selection unit SELA (FIG. 2*a*) associated with the accumulator stack.

Base Register Stack (BASE STK)

Figure 4:
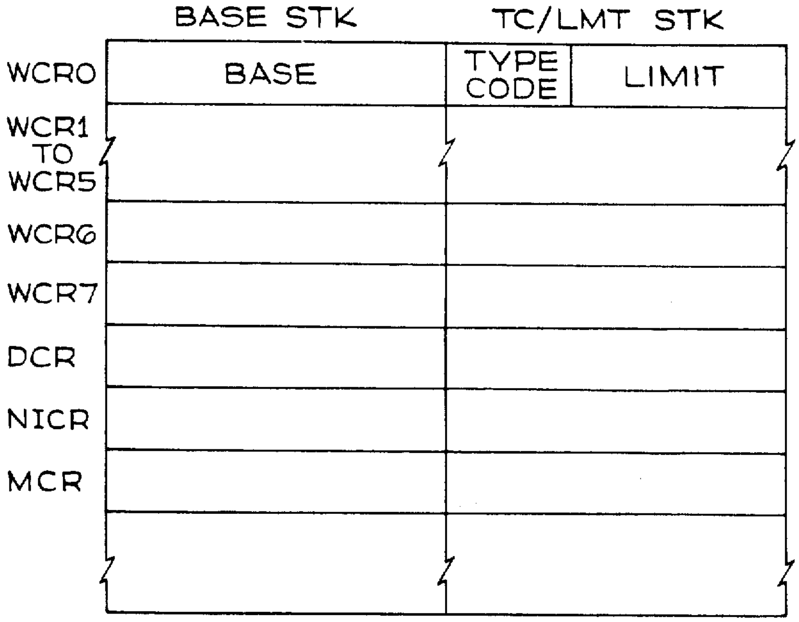
FIG. 4 shows the layout of the capability register stack of the processor module of FIG. 2.

This scratch-pad unit is used to provide a number of "half" capability registers for the processor module. It was stated above that the memory protection system incorporates a number of so-called capability registers each of which holds a capability word consisting of a segment descriptor(base address and a limit address) and a permitted access type code. The base register stack holds the base addresses for all the capability registers. FIG. 4 on the left-hand side shows the half capability registers held in this stack and they consist of eight so-called "work-space" capability registers WCRO to WCR7 and a number of so-called "hidden" capability registers. Only three of the hidden capability registers are shown (DCR, NICR and MCR) in FIG. 4 as these are the only hidden capability registers which are of importance in the understanding of the present invention. The workspace capability registers are selectable by selection code fields in the machine instruction register IR or by micro-program control signals whereas the hidden capability registers are only selectable by special instruction word control codes and by micro-program generated selection codes.

The work-space capability registers are used to hold capability words which define some of the working areas of the memory to which the currently active process being executed by the processor module requires access. One of the work-space capability registers is used to hold a capability word which defines a "reserved capability pointer table" and by convention the reserved capability pointer table for the current process is defined by the segment descriptor held in WCR6.

The hidden capability registers are used to hold capability words which include segment descriptors which define the "administration" segments. Capability register DCR is the dump area capability register and the word therein defines the segment into which the parameters of the currently running process are to be dumped when the operations on this process are suspended. Capability register NICR holds a capability word whose segment descriptor defines a segment in which is stored a pointer which defines the capability for the dump stack for the system interrupt handler process which is to be accessed when an interrupt is forced by the trap detection circuit TD. Capability register MCR holds a segment descriptor for the segment in which the master capability table is located. The significance of all these segments and their segment descriptors will be seen later when considering the detailed operation of the system in accordance with the features of the invention.

Each base address of a capability register indicates (*a*) the store module (8 bits) in which the segment is located and (*b*) the base or start address of that segment within the storage module (16 bits).

Type Code/Limit Stack (TC/LMT STK)

This stack provides the other "half" of the capability registers and it is shown on the right-hand side of FIG. 4. Each capability register is formed by a corresponding line in both the base stack and the limit stack. Each location in this stack stores the descriptor limit address and the permitted access code of the relevant capability word.

Result Register (RES REG)

This register is fed from the processor module main highway MHW and may be used to temporarily store the result of an arithmetic operation.

Operand Register (OPREG)

This register may be fed from either the main highway MHW or the memory output highway SOH and it is used as an intermediate register in the formation of a store access address. The offset address of an instruction word is fed into this register when an instruction word is fetched from the memory.

Instruction Register (IR)

This register is used to hold the control bit fields of an instruction word when fetched from the memory. The significance of the various fields will be discussed later in the execution of a specific instruction.

Micro-Program Control Unit ($\mu$PROG)

This unit controls the sequencing and performance of the operations of the processor module in the execution of each instruction step. The unit issues timed and sequenced equipment control signals ($\mu$PECS) to (*i*) activate as required the various register input AND gates by way of suitable signals on the unreferenced input leads to those gates, (*ii*) control the operation of the arithmetic unit MILL (leads AU$\mu$S), (*iii*) control the operation of the comparator COMP (lead C$\mu$S) and (*iv*) control the setting of some of the primary indicators (leads $\mu$PIC), the secondary indicators ($\mu$SIC) and the fault indicators ($\mu$FIC). The micro-program control unit is also able (*i*) to select various registers for use in a micro-sequence over leads CRSEL and RSEL, (*ii*) to increment the contents of the memory input register SDIREG (lead +1S) and (*iii*) to generate memory access control codes on the highway SIHCS and to activate that highway's timing wire. Various control and condition signals are generated within the rest of the processor module and fed to the micro-program control unit $\mu$PROG. These signals are shown as (*a*) leads AUCS, condition signals from the arithmetic unit MILL, (*b*) leads CIS, condition and indication signals from the comparator COMP, (*c*) leads ICS, indication signals from the primary and secondary indicator registers PIR and SIR, (*d*) leads FICS, indication signals from the fault indicator register FIR and (*e*) lead OP=O, an indication signal from the zero detector ZD.

Arithmetic Unit (MILL)

This unit is a conventional arithmetic unit capable of performing parallel arithmetic on the data words presented over its two input ports. It's result is connected over the main highway MHW to a micro-program defined destination. The actual operations performed by the MILL are defined by the arithmetic unit micro-program control signals AU$\mu$S. Certain condition signals, such as overflow, are generated by the MILL and these are fed either to the primary indicator register PIR or to the micro-program control unit $\mu$PROG (signals AUCS).

Comparator (COMP)

This unit is used to compare the address loaded into the memory-data-input register SDIREG and the access operations required, with the bounds (i.e. base and limit) and permitted access code respectively of the capability word relevant to the memory access required.

The condition indicating output signals CIS produced by the comparator are fed to the micro-program control unit μPROG. The significance of the comparator's function will be evident later.

Memory-Data-Input Register (SDIREG)

This register acts as the "CPU-to-memory" or processor module output register and address data or working data for passage to the memory is assembled in this register prior to its passage thereto over the memory input highway SIH.

Primary Indicator Register (PIR)

This register is used to hold eight primary indicators which require retention (in the process dump-stack) when a process is suspended.

Typically the primary indicators include:

Bit O — Arithmetic result equal to zero
Bit 1 — Arithmetic result less than zero
Bit 2 — Arithmetic result overflow
Bit 3 — Write inverse parity
Bit 4 — Second group
Bit 5 — Interface faults inhibit
Bit 6 — Halt
Bit 7 — First attempt
Bits 8 to 23 — spare The first three indicators are affected by all data instructions whereas the remaining five indicators are manipulated by the internal hardware and certain control programs.

Secondary Indicator Register (SIR)

Figures 6A, 6B:
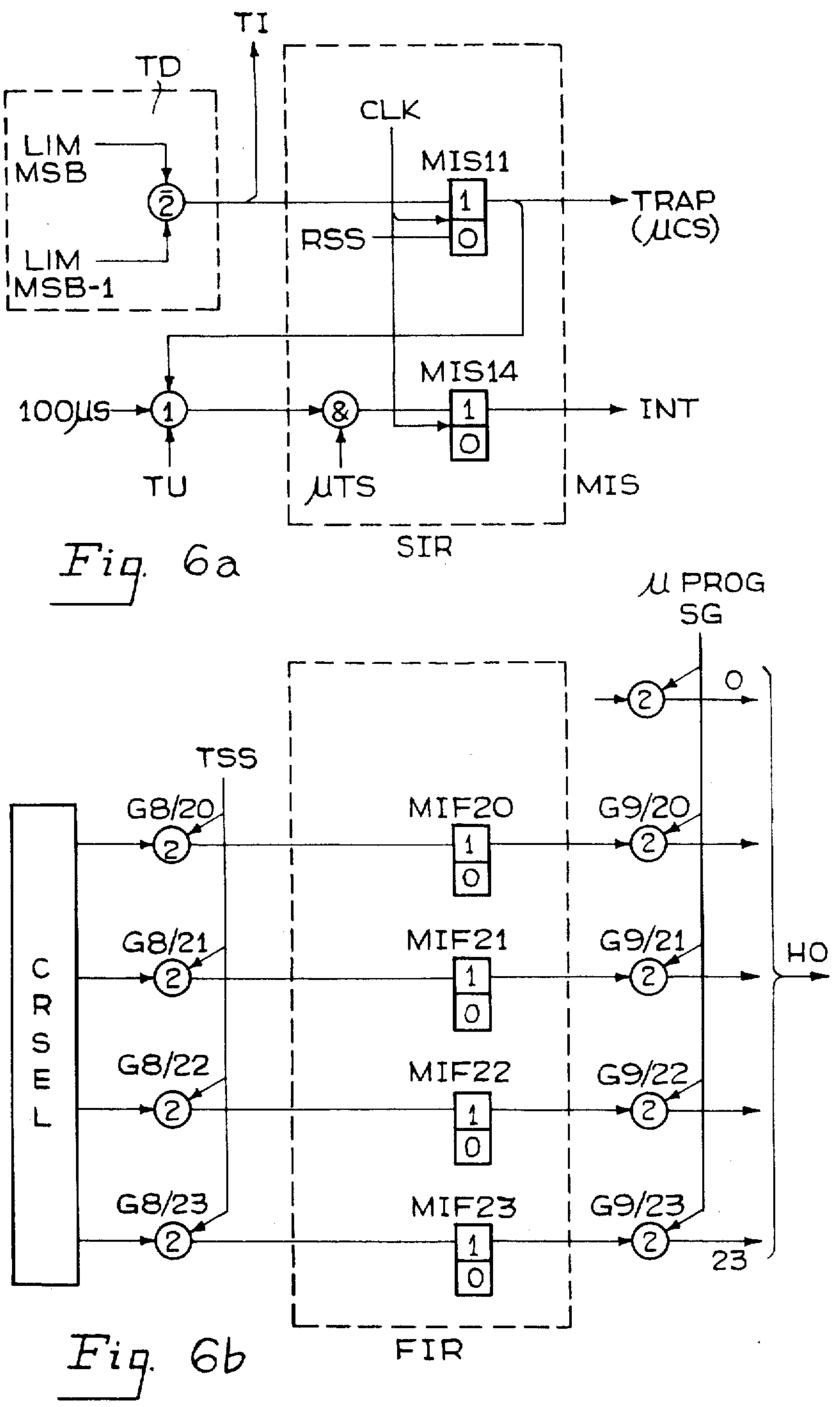
FIG. 6*a* shows a circuit diagram of a part of the secondary machine indicators register and FIG. 6*b* shows part of the fault indicators register of the processor module of FIG. 2.

This register is used to hold indicator bits mostly for use internally by the micro-program control unit μPROG. Typically this register includes arithmetic operation, fault control and interrupt indicators and includes two bits (bits 11 and 14) which are important to the embodiment of the invention. Bit 11 indicates the occurance of a "TRAP" condition whereas bit 14 is the interrupt indicator. Both these indicators are shown in FIG. 6*a* will be referred to in more detail later.

Fault Indicator Register (FIR)

This register is used to hold fault condition indicators and typically may have parity, capability-field-violation and capability-access-field-violation indicators included therein. The four most significant bits of this register are used to store the identity of the capability register in use when a capability related fault condition is detected. These four bits (MIF 20 – 23) of register FIR are shown in FIG. 6*b* and are also used when the "trap" indicator is set. Most of the contents of the fault indicator register are written into the machine fault indicators register MFI in the ACC STK after a fault or trap indication occurs.

Zero Detector Circuit (ZD)

Figure 11:
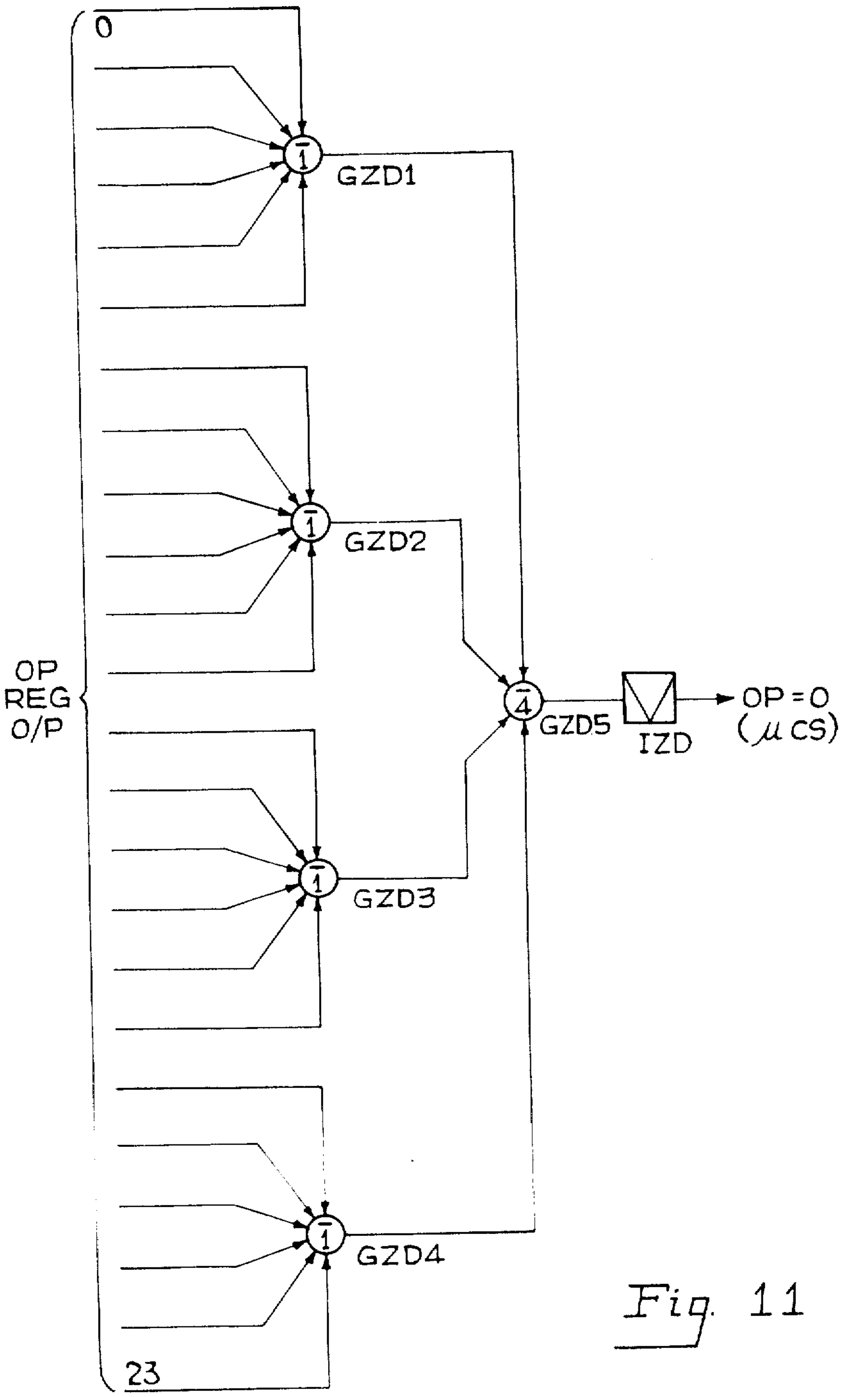
FIG. 11 shows a circuit diagram of a zero detector circuit associated with the operand register of the processor module.

This circuit monitors the contents of the operand register OPREG (FIG. 2*b*) as it is used and produces a significant output condition, on lead OP=O, to the micro-program control unit μPROG when the contents of the register are all zero's. The circuit diagram of the zero detector circuit is shown in FIG. 11 and it consists of four NOR gates GZD1 to GZD4, each having six inputs and a four input NAND gate GZD5 and an inverter IZD. The twenty-four bit output of the operand register on lead OPREG O/P are partitioned into four groups of six bits each and each group is connected to a NOR gate. Hence NOR gates GZD1 to GZD4 produce "1" state output when all limits thereto are in the "0" state. Consequently NAND gate GZD5 produces an 0 state output only when all outputs from the operand register are in the 0 state and inverter IZD, therefore, generates a 1 state (significant) signal on the micro-program condition signal lead OP=O.

Trap Detector Circuit (TD)

This circuit consists of a simple two input NAND gate, as shown in FIG. 6*a*, which drives the TRAP indicator MIS 11 of the secondary indicator register SIR over lead TI. The NAND gate is fed with the two most significant bits on leads LIM MSB and LIM MSB-1 of the access type code field each time a capability register is used. Consequently lead TI will be in the 0 state only when the before mentioned two bits are both in the 1 state. All other combinations of these two bits will produce a 1 state on lead TI causing the trap indicator bit to be set.

Trap Interrupt Operation

As mentioned above the trap indicator circuit TD of FIG. 2*b* monitors the two most significant bits of the access code field of each capability register as it is used and, upon detection therein of a trap condition, it causes the TRAP indicator in register SIP to be set. The following table shows typically the significance of the various combinations of the two most significant bits of the access code field of a capability word.

| Bit 22 | Bit 23 | Significance |
|---|---|---|
| 1 | 1 | Active store block (segment) capability |
| 1 | 0 | Passive store (backing) block (segment) capability |
| 0 | 1 | Resource capability |
| 0 | 0 | Null capability |

From the above it can be seen that in all cases of bit combination, other than both in the 1 state, activity outside the normal currently running process is required. In the case of the access code defining (*i*) a backing store segment (bits 10) a "page changing" process is required, (*ii*) a resource (bits 01) an input/output handler process is required whereas (*iii*) a null capability requires reference to a trap handler process as the capability register use may be in error. It will therefore be appreciated that the detection of a "trap" condition whenever a capability register is used necessitates the execution of a "change-process" micro-sequence suspending the current process and switching into a "trap handling" process.

Figure 5:
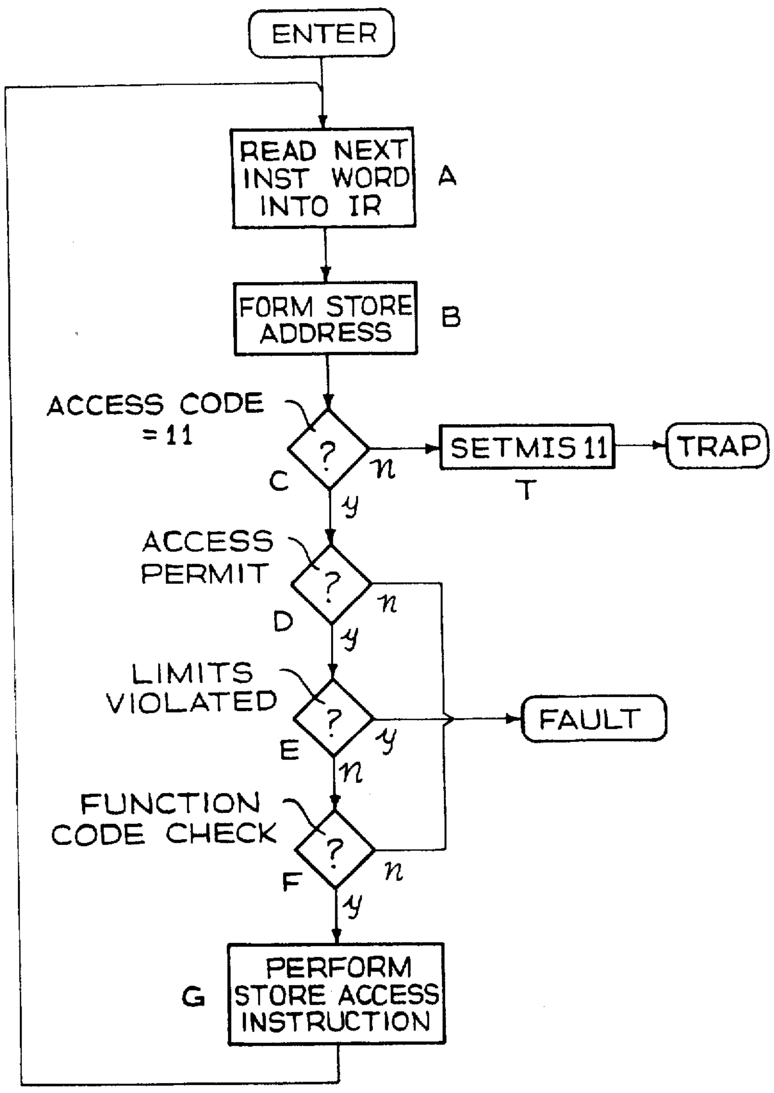
FIG. 5 shows a flow diagram of a memory access instruction for the processor module.

FIG. 5 shows, broadly, the operations performed for each processor module instruction requiring access to information not currently resident in the processor module itself. The operation of the processor module of FIGS. 2*a* and 2*b* in accordance with the steps of FIG. 5 will now be considered.

In the first step (A) the information, instruction word, produced by the memory on the highway SOH is fed into the instruction register IR (FIG. 2*b*) by activating, under micro-program control, gate G1. Gates G2 and G3 are also activated under micro-program control at this time allowing the instruction word address offset section to be fed into the operand register OPREG.

In the second step (B) the external address required is constructed and this is performed by adding the offset address in the operand register to the base address of a particular capability register specified in the instruction word. This is achieved by the micro-program control unit μPROG (*i*) applying to leads CRSEL the particular capability register selection code, (*ii*) opening gates G4 and G5, (*iii*) instructing the MILL to perform an add operation and (*iv*) opening gate G6.

Thereafter the result (address offset plus segment base address) may be recirculated by way of the MILL with gate G7 activated after selecting (using leads RESEL) an instruction word defined modifier accumulator if address modification is called for.

The presentation of capability register selection information on leads CRSEL in step B is also active upon the other half of the capability register allowing the trap detector circuit TD to monitor the two most significant bits of the access code (TC) and step C of FIG. 5 shows this function. If the access code defines a memory segment steps D, E and F are performed checking the type of access required, checking to see if the address formed still lies within the bounds of the required segment and checking to see if the access required is compatible with that permitted before accessing the memory and performing the instruction function (step G). If any of the checks of steps D, E and F fail then the fault indicator is set and the processor module changes process to a fault handler process.

The test, on the most significant two bits the access code in the capability register specified by the instruction word, performed in step C of FIG. 5, if unsuccessful (lead n) will cause step T to be performed before entering a "trap" micro-sequence. Step T is performed by the clocked setting of bit 11 of the indicator register MIS as shown in FIG. 6*a* under the control of the trap detector TD.

Figure 7:
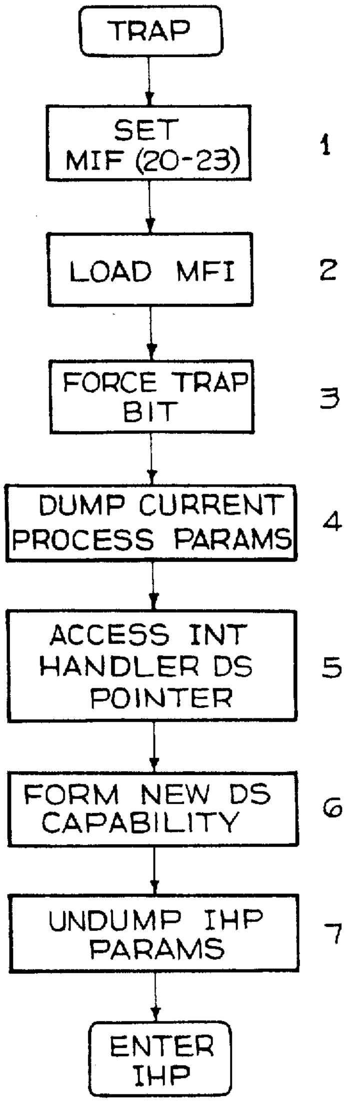
FIG. 7 shows a flow diagram of the so-called "trap" micro-sequence.

FIG. 7 shows the flow diagram of the trap micro-sequence and this diagram will now be described with reference to the actions of the processor module of FIGS. 2*a* and 2*b*. The setting of the "trap" indicator MIS11 (FIG. 6*a*) causes the TRAP signal to be passed to the micro-program control unit μPROG (FIG. 2*b*) as one of the indicator control signals ICS and the trap micro-sequence is performed as follows.

Step 1 Set MFI (20–23)

In this step the micro-program control unit μPROG (FIG. 2*b*) opens gate G8 causing the four most significant bits of the fault indicator register FIR to be set to the current state of the CRSEL leads. It will be recalled that the "trap" indicator is set while step B of FIG. 5 is in progress and consequently the CRSEL leads will be carrying the address code of the capability register defined by the instruction word whose segment descriptor relates to the instruction word offset address. FIG. 6*b* shows this operation as gates G8/20, G8/21, G8/22 and G8/23 (functionally shown in FIG. 2*b* as gate G8) are opened by the micro-program produced trap-set signal TSS and toggles MIF 20 to 23 are thereby set according to the states of the CRSEL code.

Step 2 Load MFI

In this step, under micro-program control, gates G9 and G10 of FIGS. 2*a* and 2*b* are opened and leads RSEL are conditioned with a code defining the fault indicators accumulator MFI (FIG. 3) in the accumulator stack ACC STK. Consequently the contents of the fault indicator register FIR (and more particularly bits 20 to 23 thereof) are written into accumulator MFI.

Step 3 Force Trap Bit

This effectively records that the trap indicator has been set so that the interrupt handler process will subsequently know the reason for entry therein. The interrupt handler process makes use of an interrupt accept word accumulator IAW (FIG. 3) in the ACC STK and one bit of this accumulator is reversed for use exclusively as a "trap accepted" bit. In actuality the normal interrupt system of the processor module of the embodiment of the invention is that disclosed in copending application Serial No. 176,464 and the interrupt handler is organised to use the interrupt accept word to define the reason for entry. The trap accept bit is set by opening, under micro-program control, gates G7 and G10 and instructing the MILL to set to 1 the "trap accepted" bit after selecting in the ACC STK the IAW accumulator.

Step 4 Dump Current Process Programs

At this stage the processor module has effectively inhibited the operations of the process it was performing prior to the generation of signal TI. It is now necessary for the processor module to perform a "change process" operation to preserve in the system memory the current state of the parameters for the inhibited process.

Figure 8:
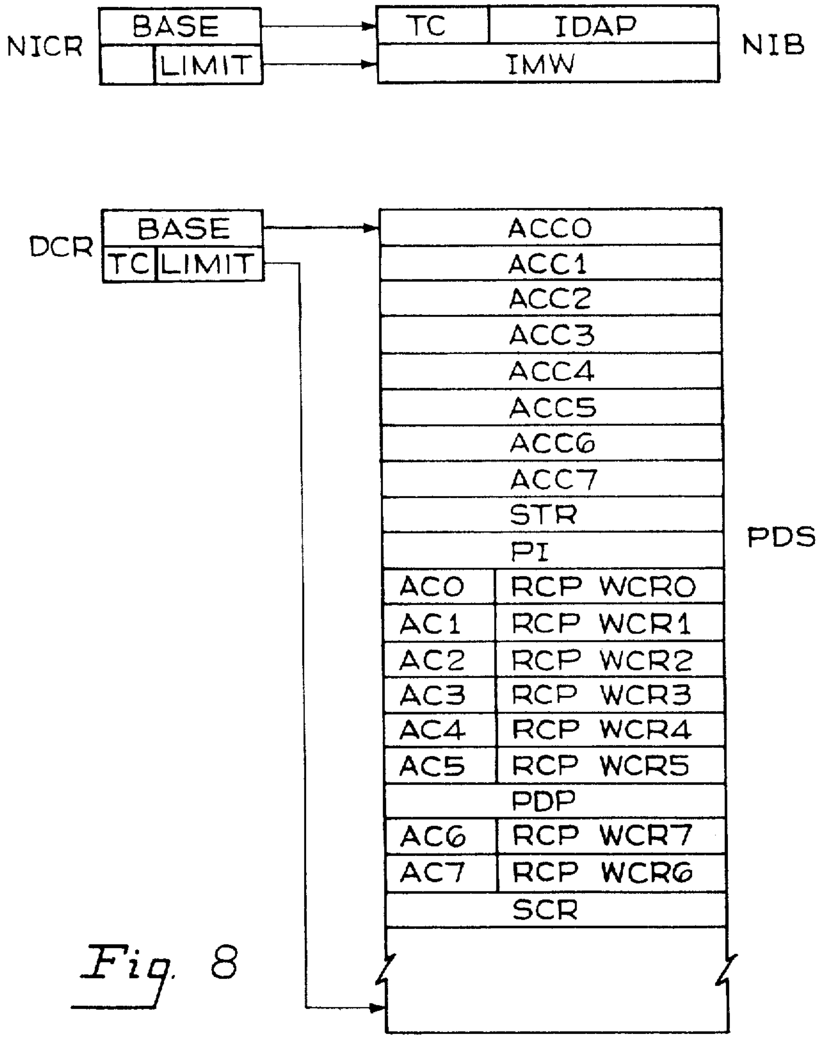
FIG. 8 shows the significance of certain capability words held in the hidden capability registers of the processor module.

It was mentioned previously that each process is provided with a so-called dump stack PDS (as shown in FIG. 8) and the segment in which it resides is defined by the segment descriptor in the dump capability register DCR. Each dump-stack contains information about the state of the currently running process, such as the values of the reserved capability pointers (RCP) corresponding to each of the work-space capability registers WCR0 to WCR5. These locations in the dump-stack are loaded with the corresponding pointer whenever a capability register is loaded as is shown in our copending application Serial No. 146,334. However, the dump area segment is also used to store the contents of the registers of the ACC STK and the pointers for the current process program code segment (capability register WCR7) and the current processes reserved segment pointer table (capability register WCR6) together with the value of the sequence control register SCR, when the current process is changed (i.e. suspended). FIG. 8 shows the layout of the process dump area and, during the "change process' sequence, step 4 of FIG. 7 causes the contents of each of the accumulators ACC0 to ACC7 and the current setting of a scheduler timer register STR and the contents of the primary indicator register PIR to be dumped. The actual operations performed in the processor module of FIGS. 2*a* and 2*b* require: (*i*) the forming of the first dump area address by selecting (over leads CRSEL) the DCR base address and accessing the memory (by opening gates G5, G11, G12, G13 and G14 with the usual bounds/access check arrangements) at the dump-stack, the dump-stack address is also saved, in the result register RES REG (by opening gates G15 at the same time as gates G11 are opened) for successive dump-stack accesses and (*ii*) the passage of the relevant register contents (over gates G7, G11 and G14) for each entry in the ACC STK with the updating by one of the access address (opening gates G16 and G7 and instructing the MILL to perform an add 1 operation). The above (*i*) and (*ii*) referenced operations are repeated for the storage of accumulators ACC0 to ACC7 and for the scheduler timer register STR in the ACC STK in the dump-stack. The primary indicators are loaded into the dump-stack by opening gates G17 and G11 and G14 after addressing the dump-stack at the next location.

Also located in the dump-stack is a push-down pointer PDP and the value in this location relates to the remaining area "below" it in FIG. 8 which is operated as "push-down" portion. The value in the push-down pointer defines the currently accessable three word "packet" in the push-down portion and it is an offset from the base of the dump area segment. The push-down pointer PDP is written into the "dump-stack push-down pointer" register DSPP (FIG. 3) in the ACC STK when the corresponding process is selected for processing by the processor module. This pointer register DSPP is then used when "calling" or "returning" from nested subroutines and the nexting of these subroutines is provided for by the three word packets of the push-down portion of the dump-stack. Each packet contains the pointers for capability registers WCR7 and WCR6 together with the relativised value of the SCR. Hence step 4 of FIG. 7 also accommodates the loading of the push-down stack pointer PDP in the dump area with the corresponding value from the pointer register DSPP.

Step 5 Access INT Handler DS Pointer

In a normal "change process" sequence the processor module will be provided, in the corresponding instruction word, with the offset down the reserved capability pointer table of the process which is used to access the master capability table to obtain the dump-stack for the process to which the change is to be made. However, in the current situation the change process sequence is automatic (i.e. as a result of the setting of the trap indicator) and consequently the dump-stack for the interrupt handler process must be obtained in a different manner. Reference to FIG. 8 shows a dedicated normal interrupt block NIB which is particular to the processor module and is referred by the segment descriptor in the normal interrupt capability register NICR. This block is arranged to include an interrupt handler process dump-stack pointer IDAP together with the permitted access type code therefore.

Step 6 of FIG. 7 uses this pointer to obtain the entry in the master capability table which stores the bounds and sum-check codes for the interrupt handler process dump-stack. The actual operations performed are the same as those used for any "load capability register" operation (which will be described later) with the exception that the micro-program unit $\mu$PROG, (FIG. 2) defines the dump capability register DCR over its selection leads CRSEL, into which the segment descriptor is to be loaded. The actual loading of the dump-stack capability register DCR will be performed in step 6 of the flow diagram of FIG. 7.

Step 7 Undump IHP Params

In this step the newly loaded dump-stack capability register DCR, which now of course contains the dump-stack segment descriptor of the interrupt handler process, is used to copy the various parameters of this process into the relevant registers of the processor module. FIG. 8 at the bottom shows the layout of the dump area segment. Each of the capability registers WCR0 to WCR7 is loaded by using the relevant dump-stack stored pointer to access the master capability table in a similar manner to that used for a "load-capability-register" instruction and the absolute value of the SCR will be derived when it is loaded by the addition of the base address value from WCR7.

Enter Interrupt Handler Process

Upon the completion of the operations of step 7 of FIG. 7 the operations of the change process to the interrupt handler process are complete. However it is necessary for the interrupt handler process to be aware of the interrupt accepted and this is achieved by reference to the code which was placed in the interrupt accept word register IAR in the ACC STK in step 3 above. It will be noted that the contents of this register are not involved in the dumping (step 4) and undumping (step 7) operations and step 3 was used to load this register with a condition which will be detected by the interrupt handler process as being definitive of a trap condition detection. It will, also be recalled that the fault indicator register FIR and the fault indicator accumulator MFI are not involved in the change process operations and consequently they are currently registering in bits 20–23, the stack address code for the capability register used when the trap condition was detected. These latter registration operations were performed in steps 1 and 2 of FIG. 7. Consequently the interrupt handler process by reference to bits 20–23 of the fault indicator accumulator MFI may obtain the address of the capability register used.

This address of course also may be used to compute the location in the dump stack of the suspended process at which the reserved capability pointer for that capability register is stored. Consequently by reading this pointer word and testing the access code thereof the interrupt handler process may ascertain the reason for the process being trapped. If the segment to which access is required resides in backing store a disc handler process will be scheduled to page into the memory the required segment. If the access code defines a resource capability an input/output handler process will be scheduled to handle the required action whereas if the access code is a "null" capability the process will be suspended waiting for the freeing of the segment in question.

From the above it can be seen that the invention provides a mechanism for the entry into an interrupt handling process each time a capability register is used which has an access code whose most significant bits are other than 11. It now remains to show how these bits may be loaded with a code other than 11.

Load Capability Register Instruction Operation

Figure 9:
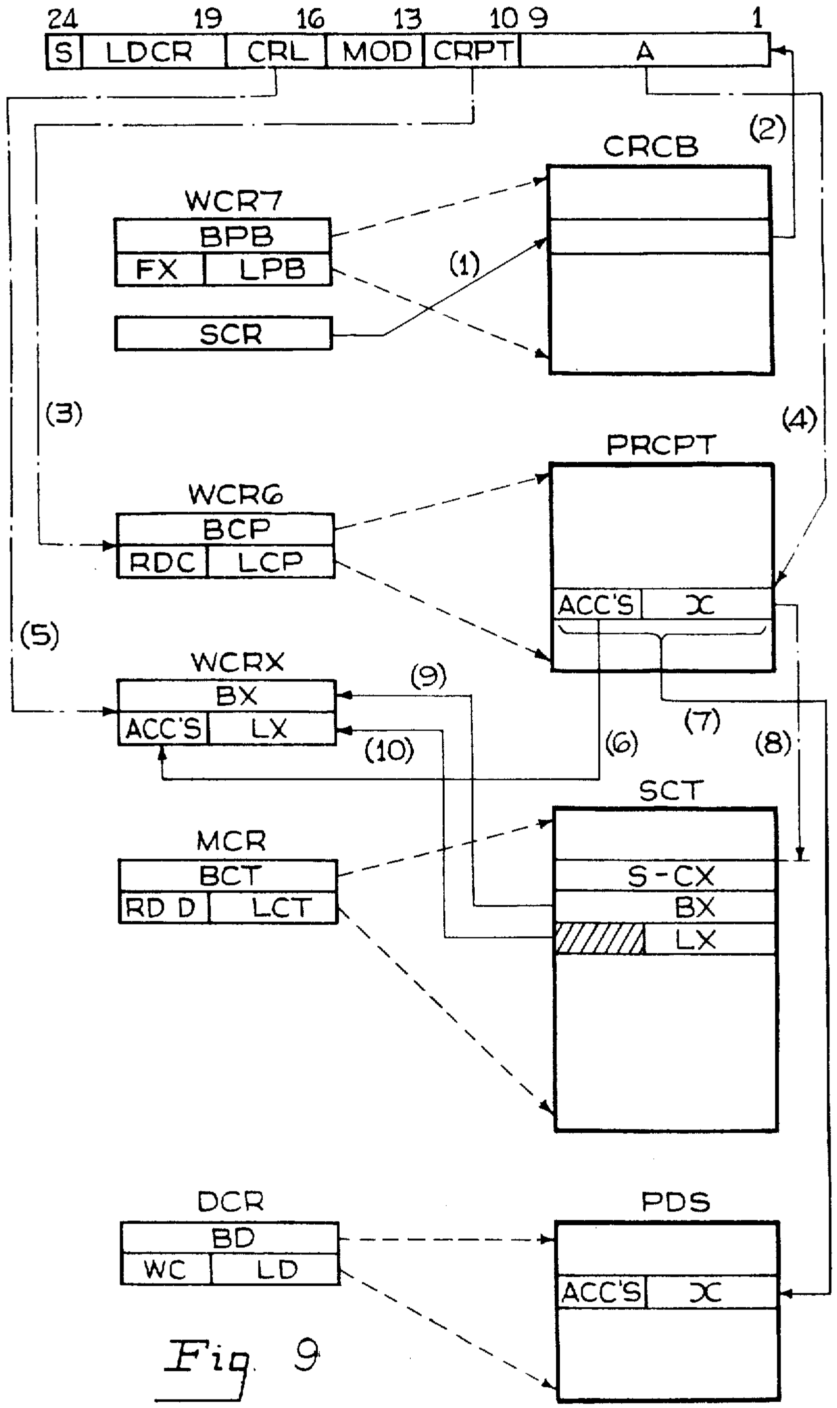
FIG. 9 shows a schematic diagram of the operations performed when executing a "load capability register" instruction.

As mentioned previously all capability registers are loaded in accordance with the methods described in our co-pending application Serial No. 146,334 and FIG. 9 shows diagramatically the operations performed by a load capability register instruction.

Figure 10:
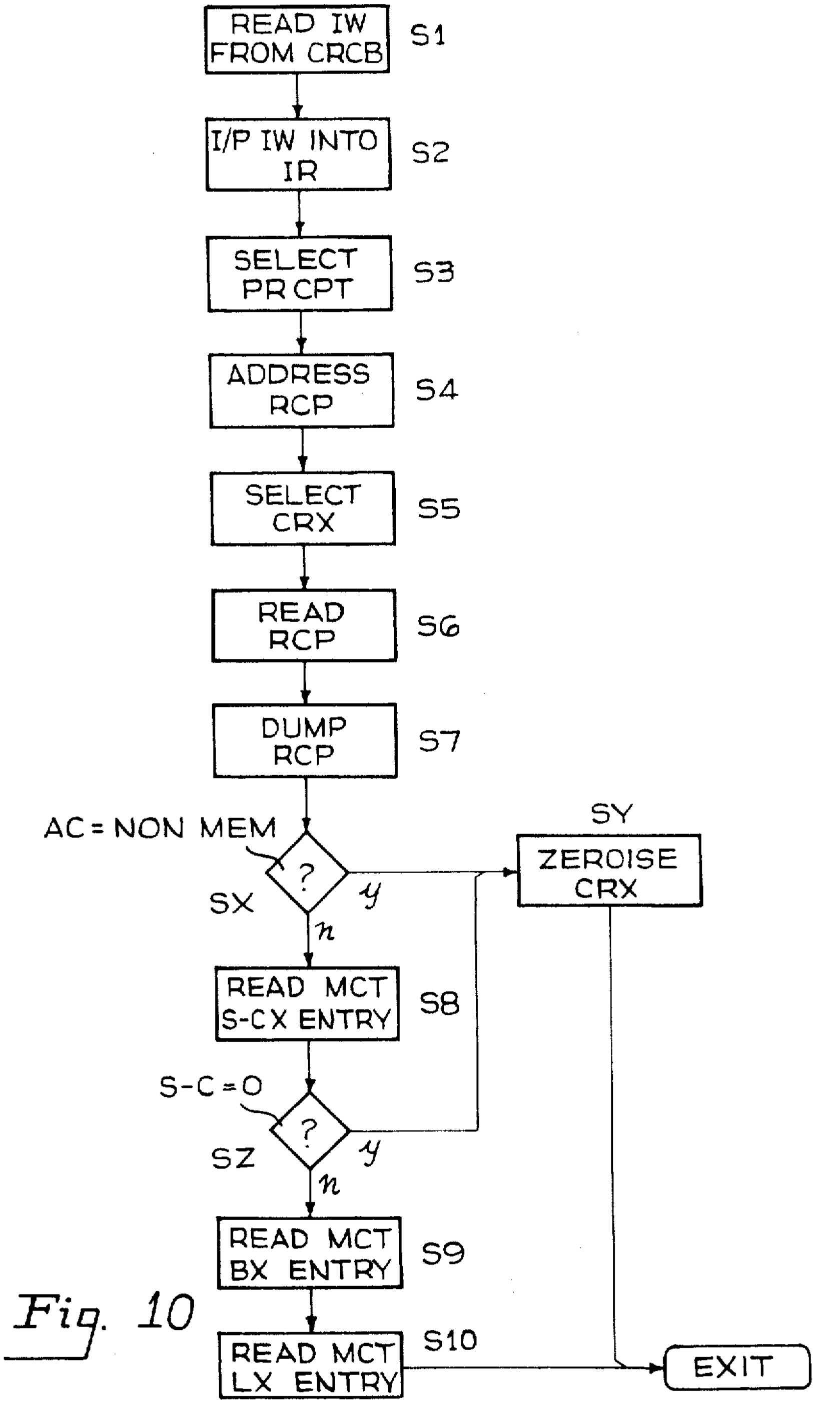

The drawing of FIG. 9 is provided with ten bracketed references and these indicate the ten basic steps of the load capability register micro-sequence a flow diagram of which is shown in FIG. 10. The various steps of FIG. 10 are referenced S1 to S10 to correspond to the references of FIG. 9 whereas the three steps which are specific to the embodiment of the invention are referenced SX, SY and SZ.

The following description will be sectionalised in accordance with the steps of FIG. 10 and reference to FIGS. 2*a*, 2*b* and 9 will frequently be made.

Steps S1 – Read IW from CRCB

In this step the program block CRCB (FIG. 9) of the current process is accessed for a read operation at the next instruction word by an address defined by the setting of the sequence control register SCR relative to be base address of capability register WCR7. In FIGS. 2*a* and 2*b* these operations are performed under control of the micro-program control unit $\mu$PROG by (*i*) selecting the SCR, using leads RSEL, (*ii*) selecting the capability register WCR7, using leads CRSEL, (*iii*) activating gates G18 and G7, (*iv*) instructing the arithmetic unit MILL to perform an add operation, (*v*) opening gates G11, (i vi) activating the comparator COMP for access and limits tests and (*vii*) activating gates G14 and highway SIHCS. Path (1) of FIG. 9 shows this step.

Step S2 – I/P IW into IR

This step controls the gating into the processor module of the instruction word accessed in step S1. The micro-program control unit μPROG (FIG. 2*b*) will open gates G1, G2 and G3 when the timing wire on the memory output control signal highway SOHCS indicates that the instruction word in on the memory output highway SOH. The instruction word read is shown at the top of FIG. 9 and it consists of a number of administration fields (bits 10 to 24) and an address offset field (bits 1 to 9)A. The administration fields define (*a*) bits 10 – 12 (CRPT) the capability register WCR7 which relates to the reserved capability pointer table (*b*) bits 13 – 15 (MOD) the accumulator to be used as an adress modifier register, (*c*) bits 16 – 18 (CRL) the capability register to be loaded, (*d*) bits 19 – 23 (LDCR) the function code which in this case defines the "load capability register" instructor and (*e*) bits 24 (S) the direct or store operation bit. Path (2) of FIG. 9 shows this step.

Step S3 — Select PRCPT

In this step the micro-program control unit μPROG in FIG. 2*a* conditions the CRSEL leads to select the working capability register defined by the CRPT field of the instruction word. This operation is shown by path (3) in FIG. 9.

Step S4 — Address RCP

In this step the reserved capability pointer item adress is formed and path (4) in FIG. 9 indicates this operation. This micro-program control unit μPROG activates gates G4 and G5, instructs the MILL to perform an add operation and activates gates G11 and G14. At the same time as gate G14 is actuated a read code is applied to highway SIHCS and the timing wire is activated.

Step S5 — Select CRX

In this step the micro-program control unit applies the CRL field information to leads CRSEL of FIG. 2*a* to select the capability register (WCRX in FIG. 9) to be loaded. Path (5) in FIG. 9 depicts this step.

Step S6 — Read RCP

In this step the reserved capability pointer item word (i.e. capability word access code and reserved capability pointer address offset) is fed into the processor module from the memory output highway SOH. The access code is fed into the TC section of the limit stack LIM STK at the location selected in step S5 whereas the whole word including the access code and the pointer address offset is fed into the operand register OPREG. These operations, depicted in FIG. 9 by path (6), are performed under micro-program control by activating gates G2, G3 and G19 of FIGS 2*a* and 2*b* when the timing wire of the control signal highway SOHCS is activated.

Step S7 — Dump RCP

In this step, depicted by path (7) of FIG. 9, the reserved capability pointer, resident in the operand register OPREG (FIG. 2*b*) is copied into the current processes dump-stack at the location reserved for the capability register to be loaded. This operation is performed under micro-program control by (*i*) selecting, over leads CRSEL, the process dump-stack capability register DCR, (*ii*) activating Gates G5, (*iii*) generating an offset address code on leads GOS defining the offset address of the word required in the dump-stack (*iv*) activating the MILL for an add operation, (*v*) activating gates G11 and G14 and (*vi*) accessing the memory for a write operation. The subsequent write operation involves the contents of the operand register which are applied over gates G4, G11 and G14 to the store.

Step SX — AC = Non-Mem?

In this step the access code fed in step S6 into the TC section of the limit stack LIM STK is tested to see if it relates to a non-memory capability (i.e. the most significant bits are 11). This operation is performed by activating leads CRSEL with the code in the CRL field of the instruction word and testing the state of lead TI. It will be recalled, by reference to FIG. 6*a*, that the signal TI is produced when the trap detector TD detects a trap condition (i.e. the most significant two bits of the access code are not 11). It should be realised that the trap indicator in the secondary indicators is not set as these indicators are not clocked (on lead CIK) at this time. If signal TI is in the 1 state step SY is performed.

Step SY — Zeroise CRX

In this step capability register WCRX is again selected and gates G19 and G20 in FIGS. 2*a* and 2*b* are activated under micro-program control. This causes zero (the current output from the MILL on the highway MHW) to be written into both halves of the capability register WCRX and the load capability register instruction micro-sequence is ended. Consequently if the access code as held in a reserved capability pointer table of any capability is other than that of a memory segment the entire contents, including the access code, of the corresponding capability register as it is to be loaded is reset to zero.

If the result of the test in step SX was no (i.e. lead TI=O) step S8 is performed.

Step S8 — Read MCT S-CX Entry

In this step the first word of the three word entry in the master capability table is read. This operation is depicted in FIG. 9 by path 8 and involves (*i*) the selection of capability register MCR (*ii*) the actuation of gates G4 and G5 (*iii*) the actuation of the MILL for an add operation and (*iv*) the actuation of gates G11 and G14 under micro-program control. When the store read operation is complete gates G2 and G3 are opened and the sum-check word is fed into the operand register. Gate G15 is also opened at this time to save the MCT address.

It was mentioned previously that each entry in the master capability table (MCT in FIG. 9) is formed of three words. The first is arranged to be a sum-check code relevant to the other two words of the entry. When relocation occurs the relocating process indicates to the rest of the system that access to the segment involved is temporarily to be suspended by writing into the sum-check code word location of the master capability table entry an all zero's word. Hence as the sum-check code S-CX for the segment descriptor to be loaded into register WCRX is currently resident in the operand register, step SZ is used to test to see if the segment is being relocated.

Step SZ — S—C=O?

The micro-program control unit μPROG (FIG. 2*a* and 2*b*) tests the state of lead OP=O from the zero detector circuit ZD to see if the sum-check code is zero. The zero detector circuit ZD is shown in FIG. 11 and it will be seen that if all the inputs from the OPREG O/P are in the 0 state NOR gates GZD1 to 4 will all produce 1 state outputs causing a 0 state output from NAND gate GZD5 and consequently a 1 state output on lead OP=O. If any one or more of the OPREG O/P inputs are at 1 the NOR gate upon which it is terminated will produce a 0 state output which causes a 1 state output from gate GZD5 and consequently a 0 state condition on lead OP=O.

If lead OP=O is in the 1 state step S7 is performed before exiting from the load capability register microsequence. However, if lead OP=O is in the 0 state step S9 is performed.

Step S9 — Read MCT BX Entry

In this step, shown by path 9 in FIG. 9, the base address of the master capability table entry is read into the base half of the capability register stack at the location defined by the CRL code field of the instruction word.

Step S10 — Read MCT LX Entry

In this step, depicted by path 10 in FIG. 9, the limit address of the master capability table entry is read into the limit half of the capability register (WCRK) to be loaded. This step completes the operation of loading the capability register.

CONCLUSIONS

From the above it can be seen that the invention has provided a mechanism which forces entry into an interrupt handler process when a capability register loaded with a discrete code (i.e. all zeros) is used. The mechanisms for loading the capability register with the discrete code are (*i*) when the sum-check code of the master capability table is zeroised or (*ii*) when the access code of the capability for the process is other than a memory segment indicating code. The first case allows the trapping of all processes having reference to the segment (e.g. when that segment is to be relocated) whereas the second case can be used to selectively trap a single process (i.e. the most significant two bits of the access code are 0 0) or to trap the process ready for entry into a resource handling process or the like requiring access to equipment external to both the processor module and the store modules.

A single hazard still, however, remains in relation to memory segment relocation. This is because one or more processor modules may have loaded one of their capability registers with the capability for the particular segment prior to the relocation decision. This situation may be accommodated by the segment relocating process causing an interrupt to be applied to all these processor modules. Upon entry into the interrupt handler each processor module may be returned to the process interrupted. It will be recalled that each change process operation involves the reloading of the workspace capability registers using the reserved capability pointer in the dump stack of the process changed to. Consequently the above mechanism ensures that already loaded capability registers are effectively overwritten by zero.

In the above description various items of equipment have been referred to. Reference to "Understanding Digital Computers" by Paul Siegel published by John Wiley & Sons : New York and London and "Digital Computers, Components and Circuits" by R.K. Richards published by Van Nostrand & Company Inc : New York will provide typical examples of equipment suitable for use in the block elements shown in the drawings with the exception of the scratch-pad memory stacks and the micro-program control unit. Reference to Chapter 16 of "Semi-conductor Memories" edited by Jerry Eimbinder and published by John Wiley & Sons Inc however provides information on typical location (or line) addressable random access memories ideally suited to the fabrication of scratch-pad memory stacks. Chapter 14 of the same publication provides information on the fabrication of a micro-program control unit using read-only memory elements.

What we claim is:

1. A data processing system including a memory, in which information is stored in segments at least one processor unit arranged to co-operate with said memory and provided with at least one capability register, used to store a capability word which includes a segment descriptor indicative of the base and limit addresses of a particular memory segment, said capability register being referenced each time a memory access operation relevant to said particular memory segment is performed by said processor unit, said processor unit further including a program interrupt actuating means which when activated causes the processing of the current program to be suspended and the processing of an interrupt handling program to be commenced, and said processor unit further provided with (*a*) capability register restoration arrangements operative to load at least part of said capability register with a discrete characteristic code and (*b*) discrete characteristic code detection means operative to monitor the information content of a capability register each time it is used and to activate said interrupt actuating means upon detection of said discrete characteristic code in said part.

2. A data processing system as claimed in claim 1 and in which said memory includes a first information segment, holding a reserved pointer table particular to a currently active process under execution by said processing unit, and a second information segment having an entry for each system resource, and each item in said reserved capability pointer table defines a system resource to which the process is permitted access, each item taking the form of a pointer relative to the base of a master capability table containing an entry for each memory segment and a permitted access code defining the system resource type and the mode of access to be permitted by said active process to the system resource, and said processor unit includes first trap condition detecting means responsive to access codes defining non-memory segment system resources.

3. A data processing system as claimed in claim 2 and in which said processor unit includes second trap condition detecting means responsive to a predetermined trap characteristic condition in the master capability table entry corresponding to said particular memory segment.

4. A data processing system as claimed in claim 3 in which said first or second trap condition detecting means when activated cause said capability restoration arrangements to be operative.

5. A data processing system as claimed in claim 4 and in which each master capability table entry which relates to a memory segment comprises two parts, a first part which holds the segment descriptor of the corresponding memory segment, and a second part defines a segment descriptor check code having a form which is normally significant of the base and limit memory addresses in combination and arranged to be overwritten with said predetermined trap characteristic condition when access to the memory segment defined by said entry is to be suspended.

6. A data processing system as claimed in claim 5 in which each master capability table entry which relates to a memory segment comprises three data words the first of which stores said segment descriptor check-codes and said predetermined trap characteristic condition is indicated by all zeros in said first word.

7. A data processing system as claimed in claim 2 and in which said discrete characteristic code detection means monitors the two most significant bits of the permitted access code stored in said capability register.

8. A data processing system as claimed in claim 2 and in which a plurality of capability registers are provided in said processor unit together with means for recording the identity of the capability register in use when said discrete characteristic code is detected.

* * * * *